（12）United States Patent
Carney et al.

(10) Patent No.: US 7,042,221 B2
(45) Date of Patent: May 9, 2006

(54) SYSTEM AND METHOD FOR DETECTING A NARROWBAND SIGNAL

(75) Inventors: Laurel H. Carney, Syracuse, NY (US); Michael C. Anzalone, Syracuse, NY (US)

(73) Assignee: Syracuse University, Syracuse, NY (US)

( * ) Notice: Subject to any disclaimer, the term of this patent is extended or adjusted under 35 U.S.C. 154(b) by 0 days.

(21) Appl. No.: 10/631,131

(22) Filed: Jul. 31, 2003

(65) Prior Publication Data

US 2004/0021472 A1 Feb. 5, 2004

Related U.S. Application Data

(60) Provisional application No. 60/400,359, filed on Jul. 31, 2002, provisional application No. 60/400,357, filed on Jul. 31, 2002.

(51) Int. Cl.
G01V 3/00 (2006.01)
G01R 19/00 (2006.01)
G10L 21/00 (2006.01)

(52) U.S. Cl. .................... 324/314; 324/76.33; 704/218

(58) Field of Classification Search ................ 324/314, 324/613–615, 76.11, 76.31, 76.38, 76.12, 324/76.36, 76.68, 76.33; 375/346, 350; 704/218
See application file for complete search history.

(56) References Cited

U.S. PATENT DOCUMENTS

| | | | |
|---|---|---|---|
| 4,297,533 A | | 10/1981 | Gander et al. |
| 4,363,138 A | * | 12/1982 | Franklin et al. ......... 455/226.2 |
| 4,942,546 A | | 7/1990 | Rambaut |
| 5,553,081 A | | 9/1996 | Downey et al. |
| 5,631,877 A | * | 5/1997 | Bond ........................ 367/135 |
| 5,724,485 A | * | 3/1998 | Rainton ....................... 706/14 |
| 5,745,384 A | | 4/1998 | Lanzerotti et al. |
| 5,757,641 A | * | 5/1998 | Minto ............................ 700/4 |
| 6,031,862 A | * | 2/2000 | Fullerton et al. ........... 375/146 |
| 6,101,228 A | | 8/2000 | Hebron et al. |
| 6,215,812 B1 | | 4/2001 | Young et al. |
| 6,370,370 B1 | | 4/2002 | Roth et al. |
| 2002/0006174 A1 | | 1/2002 | Nafie |
| 2002/0071508 A1 | | 6/2002 | Takada et al. |

OTHER PUBLICATIONS

Carney et al., "A New Angle on Detection: A Physiological Model for the Detection of Tones in Noise", Abstract from a conference on Processing the Auditory Environment. Jun. 10-11, 2001.*

Carney et al. "Auditory Opponency: A Temporal Model for Masked Detection at Low Frequencies" Acta Acustica United with Acustica, vol. 88 (Jan. 7, 2002). pp. 334-347.*

* cited by examiner

*Primary Examiner*—Anjan Deb
*Assistant Examiner*—Jeff Natalini
(74) *Attorney, Agent, or Firm*—George R. McGuire; Bond, Schoeneck & King, PLLC

(57) ABSTRACT

A system for the detection of narrowband signals in wideband noise that combines information across two frequency channels that straddle the frequency of the target signal. Two band pass filters having center frequencies that straddle the frequency of the target signal and that have phase transfer functions that differ by 180 degrees relative to each other at the frequency of the target signal. The presence of the target signal is detected by performing a running cross-correlation of the outputs of saturating, non-linearities that follow from the filters, and determining when the output of the running cross-correlator drops below a predetermined threshold due to the phase shift between the two filter responses caused by the presence of the target signal.

7 Claims, 5 Drawing Sheets

SYSTEM AND METHOD FOR DETECTING A NARROWBAND SIGNAL

CROSS-REFERENCE TO RELATED APPLICATIONS

The present application claims priority to U.S. Provisional Application Ser. No. 60/400,359 filed Jul. 31, 2002, entitled "An Algorithm for Detection of a Narrowband Signal of Known Frequency in a Wideband Fluctuating Noise," and U.S. Provisional Application No. 60/400,357 filed on Jul. 31, 2002, entitled "A Noise Reduction System for use in Audio Communications," both of which are hereby incorporated by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. R01 01640 awarded by National Institutes of Health—National Institute on Deafness and Other Communication Disorders.

BACKGROUND OF THE INVENTION

1. Field of Invention

The present invention relates to the detection of narrowband signals and, more specifically, to a system and method for detecting of a narrowband signal of known frequency in a wideband fluctuating noise.

2. Description of Prior Art

The detection of a narrowband signal amidst wideband noise is an important feature in communication devices ranging from cellular telephones to human hearing aids. To detect a target signal, systems typically use a filter tuned near the frequency of the target signal that rejects the remaining noise frequencies. The ability of such a system to detect a target signal is often affected by the signal-to-noise ratio (SNR), and the effectiveness of such a system is susceptible to fluctuations in the noise level that causes fluctuations in the output energy of the filter.

Other systems for detecting a narrowband signal use previously determined information about the noise to construct a filter that is matched to the properties of the noise, such as a Wiener filter. A system such as this depends on prior knowledge of the properties of the noise, however, and is ineffective when the noise varies or is indeterminate. Some systems, such as a Kalman filter, depend on a running estimate of the properties of the noise and use a time-varying filter to optimize the signal-to-noise (SNR) ratio. These systems, however, require sophisticated modeling of the noise and require complex algorithms.

Another large class of signal detectors correlate the incoming signal and noise with a template for the target signal. These detector systems require knowledge of the incoming signal characteristics and cannot always discern signals that do not have perfect tones or long-term temporal stationarity.

3. Objects and Advantages

It is a principal object and advantage of the present invention to provide a system and method for detecting a narrowband signal in wideband noise having fluctuating characteristics, such as amplitude.

It is an additional object and advantage of the present invention to provide a system and method for detecting a narrowband signal that does not require prior knowledge of the properties of the noise.

It is a further object and advantage of the present invention to provide a system and method for detecting a narrowband signal that is not a perfect tone or does not have long-term temporal stationarity.

It is another object and advantage of the present invention to provide a system and method for detecting a narrowband signal that does not require lengthy processes or sophisticated algorithms.

Other objects and advantages of the present invention will in part be obvious, and in part appear hereinafter.

SUMMARY OF THE INVENTION

The present invention comprises the detection of a known frequency, i.e., a target signal, in wideband noise using temporal information extracted from the signal using a cross-frequency, cross-correlation. A target signal is detected in wideband noise by a running cross-correlation of the output of two narrowband filters, one having a center frequency below the known frequency of the target signal, and the other filter having a center frequency above the frequency of the target signal. The frequencies of the two filters are selected so that the phases of their transfer functions differ by 180 degrees relative to each other about the frequency of the target signal. The outputs of the two filters are processed by a saturating nonlinearity function, such as the signum function, to "clip" the amplitude fluctuations of the filter responses without affecting the times of the zero-crossings. The saturated outputs of the two filters are then compared using a running cross-correlator (or a point-by-point multiplication of the two signals, followed by a low-pass filter). If the target signal is present, the output of the running cross-correlator will decrease due to the 180-degree phase difference between the responses of the two filters at the signal frequency, an effect termed "phase opponency." With appropriate thresholding, the reduction in the output of the running cross-correlator signals indicates when the target frequency is present.

DETAILED DESCRIPTION

Figure 1:
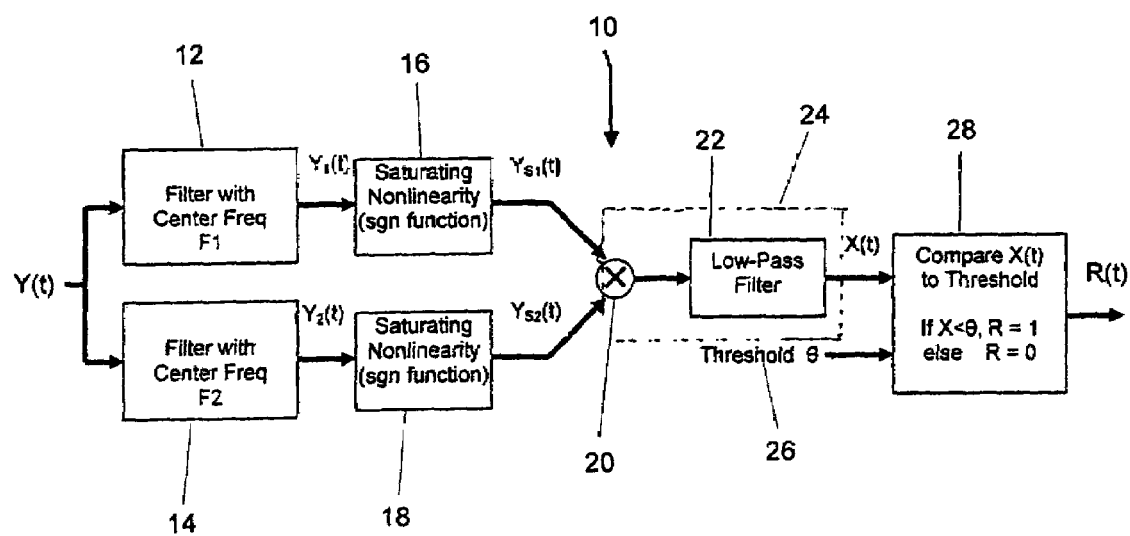
FIG. 1 is a schematic of a detector according to the present invention.

Referring now to the Figures, wherein like parts are referred to by like numerals throughout, there is seen in FIG. 1, a detector 10 according to the present invention for indicating the presence of a target signal having a predetermined frequency in wideband noise of fluctuating amplitude.

Figure 2:
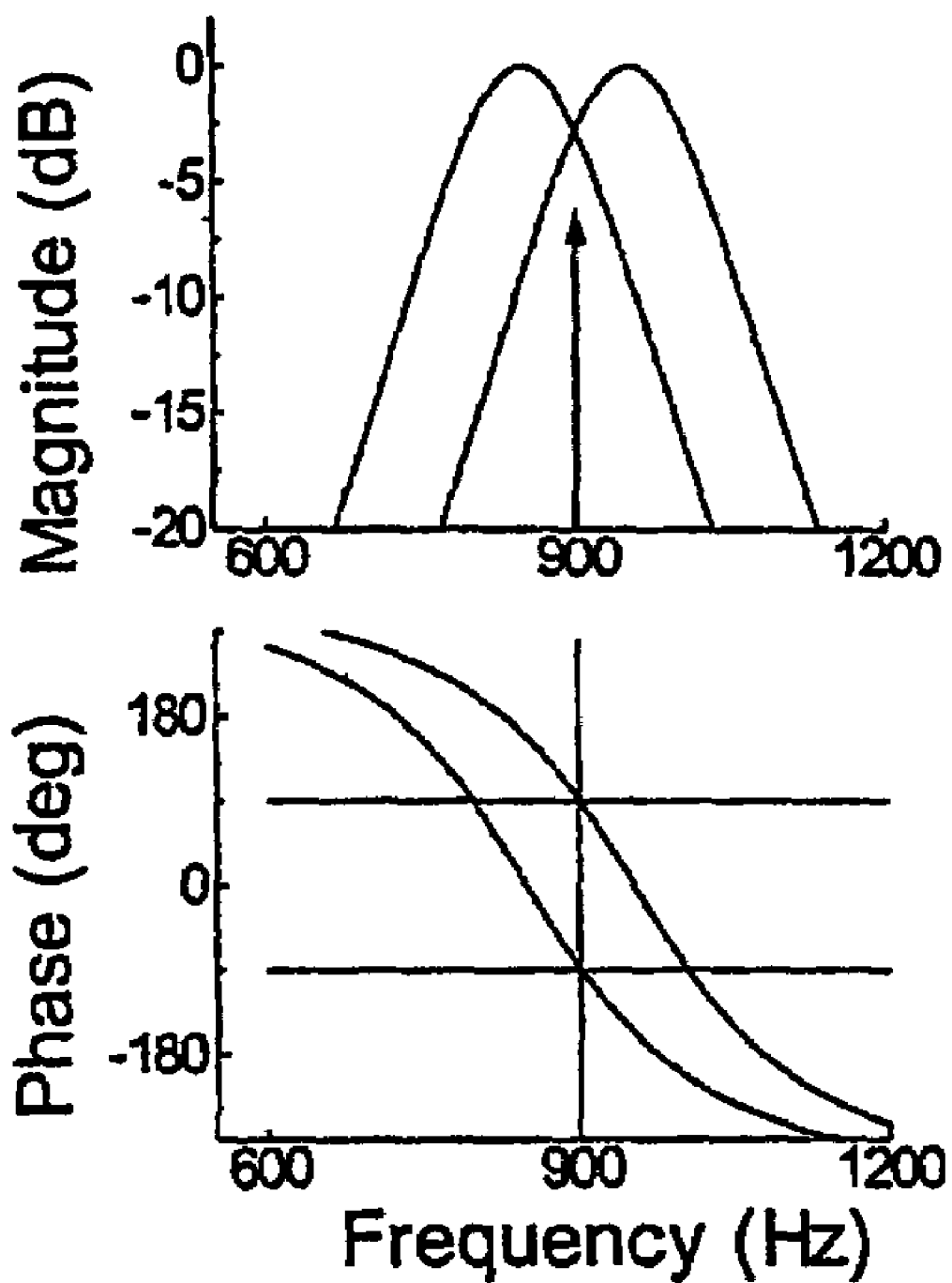
FIG. 2 contains graphs of the magnitudes and phases of the transfer functions of two filters selected according to the present invention to detect a 900 Hz target signal.

Detector 10 comprises two narrowband filters 12 and 14 having center frequencies F1 and F2. Frequencies F1 and F2 are selected to be above and below the target signal frequency and differ by 180 degrees about the frequency of the target signal and can be derived analytically for a given filter transfer function. Filters 12 and 14 can comprise two band pass filters, or a low-pass and a high-pass filter, as long as the orders of the filters are sufficient to create a 180-degree phase difference at the target signal frequency. The magnitudes and phases of the transfer functions of filters 12 and 14 used to detect a 900-Hz signal, for example, are illustrated in FIG. 2.

The outputs from filters 12 and 14 are processed by saturating non-linearity components 16 and 18 to remove amplitude information. The saturating nonlinearity components 16 and 18 creates a signal output that goes no higher than +1 and no lower than −1. For any positive value on the input, the output is set to +1 and for any negative input, the output is −1. Thus, after the saturating nonlinearity, the signal is dominated by +1, −1 and the zero crossings, and is no longer affected by changes in the signal energy. After saturation, the timing of the zero crossings is determined by the positive and negative fluctuations in the input signal and the frequency and phase information in the input signal is all that passes. The saturating non-linearity components 16 and 18 can be accomplished by a simple circuit, such as a very high-gain amplifier followed by a pair of limiters (e.g. a diode circuit), or by software programmed with a signum function, for example.

The saturated non-linear outputs are then compared by a cross-correlator 20 that measures the correlation of the signals as a function of time. Cross-correlator 20 can comprise a programmed software function, a multiplier, or modulator circuit designed from transistor circuitry.

The output from correlator 20 is then passed through a low-pass filter 22, forming what is referred to as a running cross-correlator 24. Low-pass filter 22 has a cut-off frequency that determines the integration time of running cross-correlator 24, and the output of low-pass filter 22 at any one point in time depends on recent history (depending on the corner frequency of low-pass filter 22), as opposed to depending only on the input at that moment. Detection 28 of the target signal occurs when the output of low-pass filter 22 drops below a predetermined threshold value 26 (see FIG. 4C). Lower cutoff frequencies of low-pass filter 22 results in a more sensitive detector, but in a slower response time. Thus, the desired response time and sensitivity must be considered when determining the cut-off frequency of low-pass filter 22.

Figure 3:
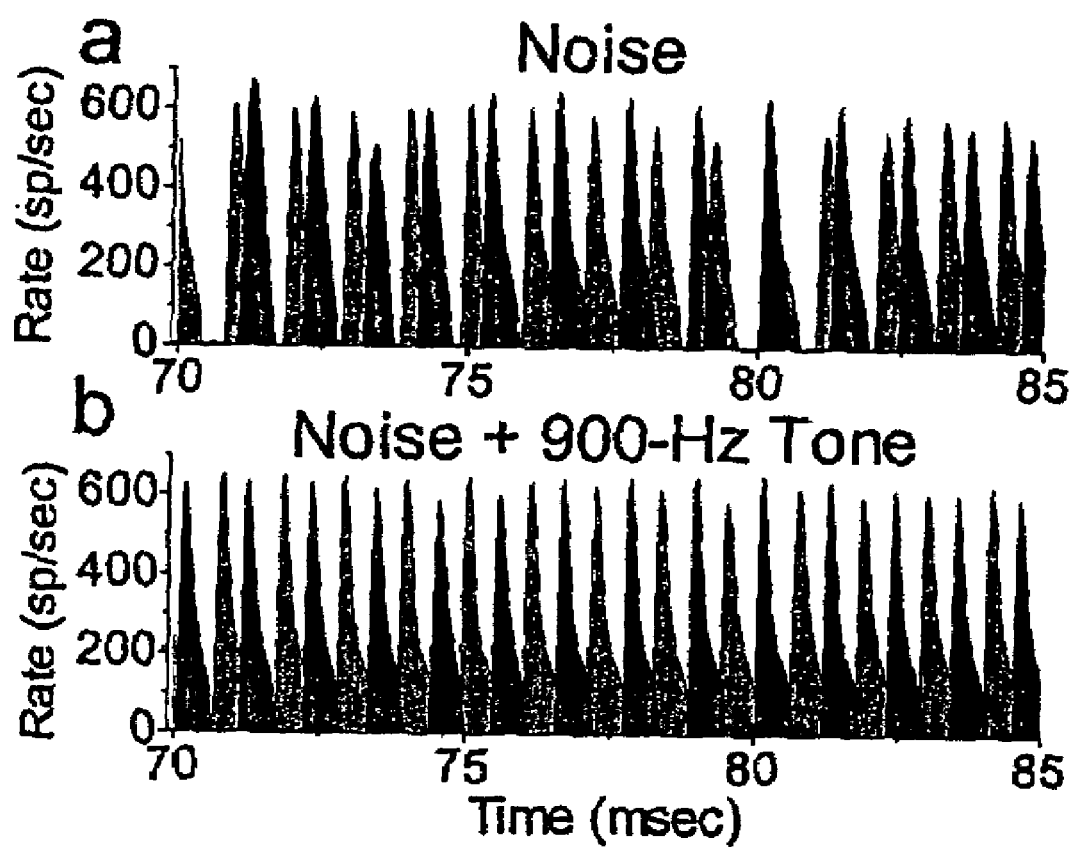
FIG. 3 contains graphs comparing the half-wave rectified responses of two filters chosen according to the present invention in the presence of (a) noise and (b) noise plus a 900 Hz target signal.

The half-wave rectified responses of filter 12 and 14 to (a) noise and to (b) noise plus a target signal (e.g., a frequency of 900 Hz) are shown in FIG. 3. The response of filter 12, for example, is shaded light gray in both panels, and the response of filter 14, for example, is shaded dark gray. In the presence of wideband noise, see FIG. 3a, the responses of filters 12 and 14 are partially correlated, due to the overlap of the transfer functions of filter 12 and 14. The times that both filters 12 and 14 respond simultaneously are shaded black in FIG. 3 for the purposes of illustration. In the presence of wideband noise, the partially correlated signals from filters 12 and 14 result in a positive response of running cross-correlator 24. In response to the wideband noise plus the target signal frequency, the responses of filters 12 and 14 are drawn out-of-phase, see FIG. 3b), resulting in a reduced response from running cross-correlator 24.

Figure 4:
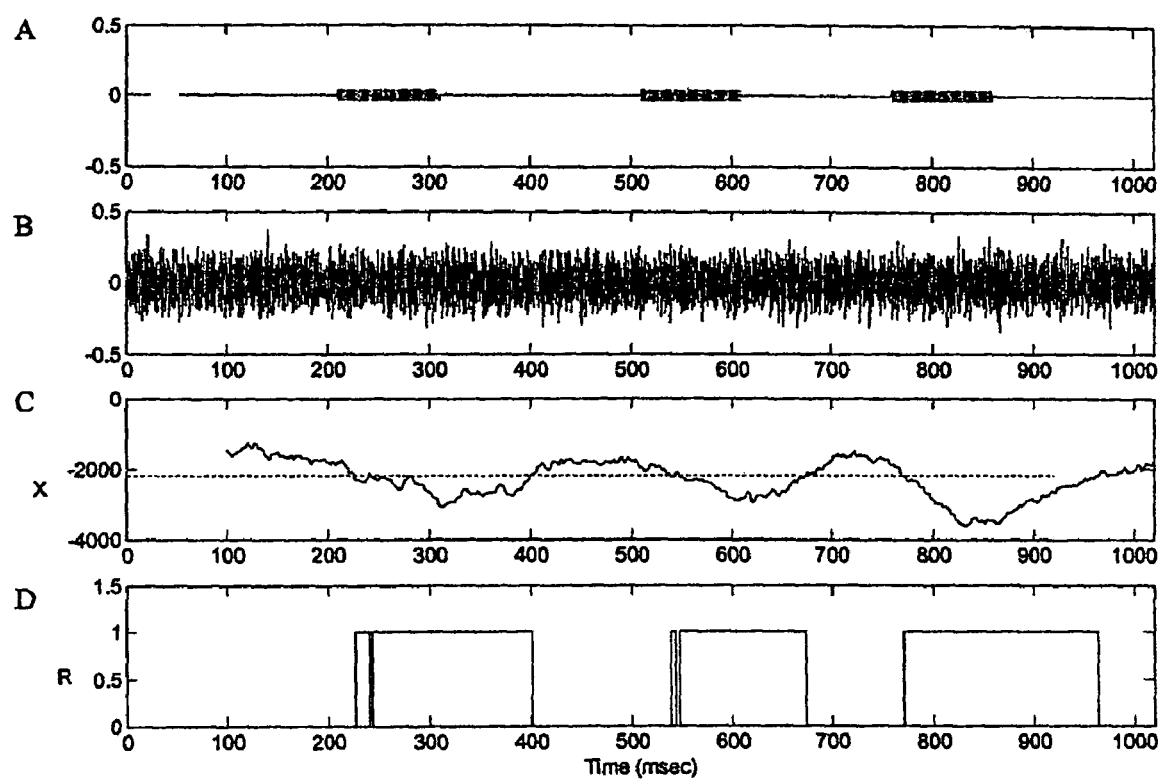
FIG. 4 is a series of graphs comparing, over time, (A) a 900 Hz target signal, (B) Gaussian noise, (C) the output of a running cross-correlator according to the present invention, and (D) the output of the detector of the present invention.
Figure 5:
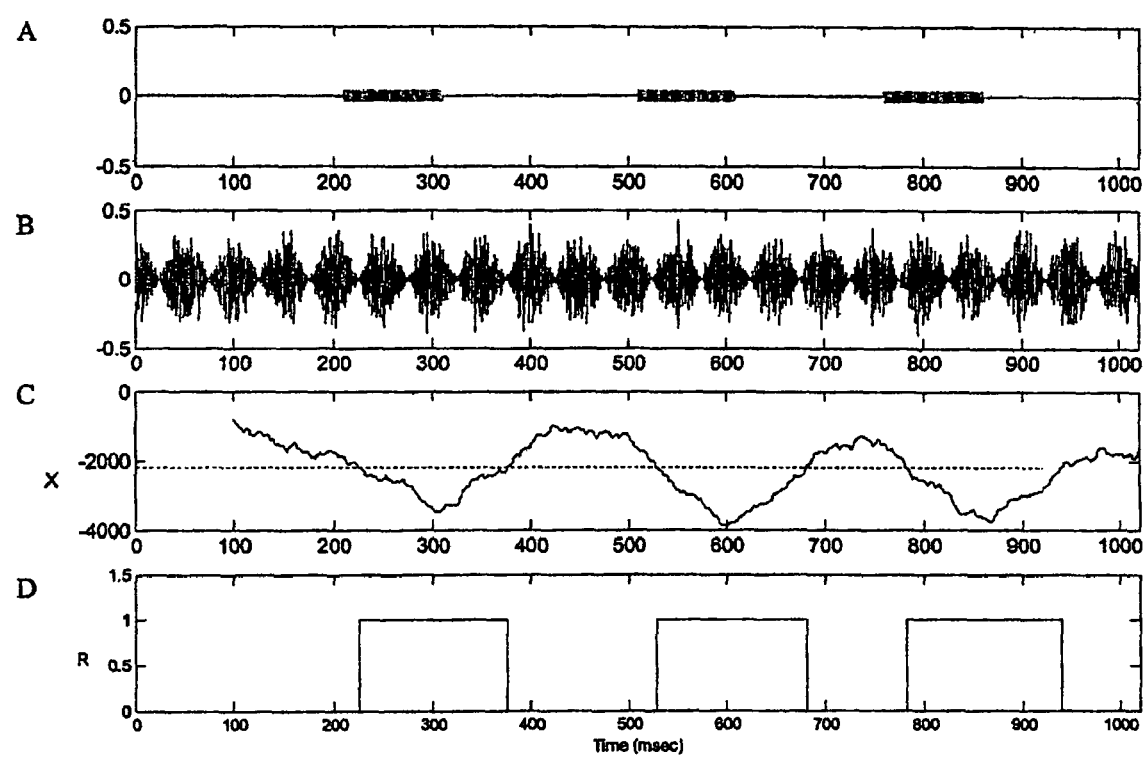
FIG. 5 is a series of graphs comparing, over time, (A) a 900 Hz target signal, (B) wideband noise having fluctuating amplitude, (C) the output of a running cross-correlator according to the present invention, and (D) the output of the detector of the present invention.

As an example, the response of detector 10 to a signal of 900 Hz in Gaussian noise can be seen in FIG. 4, which contains corresponding graphs A–D illustrating the various inputs and outputs of the present invention plotted correspondingly over time. More particularly, graph A of FIG. 4 shows the presence of several narrowband 900 Hz tones comprising the target signal. Graph B depicts 3 kHz bandwidth Gaussian noise, where the SNR is equal to 28 dB. Graph C shows the output of running cross-correlator 24 to the combination of background noise and the 900 Hz tones. When the output of running cross-correlator 24 dips below a threshold (the dotted line in FIG. 4C), the response signal is set to one, as seen in 4D. FIG. 5 depicts the various outputs of present invention when a 900 Hz signal is contained within wideband noise having fluctuating amplitude.

Detector 10 according to the present invention thus signals the presence of a known narrowband frequency within a wideband signal through the identification of a reduced response of running cross-correlator 24, as compared to the response of running cross-correlator 24 to a wideband signal containing only noise. As the reduced response of running cross-correlator 24 occurs independently of the amplitude information in the wideband noise, fluctuations in the amplitude of the noise will not adversely impact the effectiveness of detector 10.

What is claimed is:

1. A system for detecting target frequency within a signal, comprising:
    a first filter having a first center frequency and a first static transfer function, wherein said first center frequency is greater than said target frequency;
    a second filter having a second center frequency and a second static transfer function, wherein said second center frequency is less than said target frequency and wherein the phases of said first and second transfer functions differ by 180 degrees about said target frequency; and
    a running cross-correlator interconnected to said first and second filters for comparing the output of said first and second filters as said signal is filtered by both said first and second filters over time.

2. The system of claim 1, wherein said running cross-correlator comprises a cross-correlator having a predefined integration time interconnected to a low pass filter having a frequency that is inversely proportional to said integration time of said cross-correlator.

3. The system of claim 2, further comprising first and second saturating non-linearities interconnecting said first and second filter to said cross-correlator.

4. The system of claim 3, wherein said saturating non-linearities are signum functions.

5. A method for detecting a target frequency within a signal, comprising the steps of:
    (a) providing said signal to a first filter having a first center frequency and a first static transfer function, wherein the first center frequency is lower than said target frequency;
    (b) simultaneously providing said signal to a second filter having a second center frequency and a second static transfer function, wherein said second center frequency is higher than said target frequency and wherein the phases of said first and second transfer functions differ by 180 degrees about said target frequency;
(c) processing the outputs of said first and second filters with a saturating non-linearity component;
(d) performing a running cross-correlation of the saturating non-linear outputs of said first and second filters; and
(e) determining said signal is present when said running cross-correlation drops below a predetermined threshold.

6. The method of claim 5, wherein the step of performing a running cross-correlation comprises providing the saturating, non-linear outputs of said first and second filters to a cross-correlator and then filtering with a low-pass filter that determines said integration time of said running cross-correlation.

7. The method of claim 6, wherein the step of processing said first and second outputs with a saturating non-linearity is performed by a signum function.

* * * * *